(12) United States Patent
Harada et al.

(10) Patent No.: US 9,238,846 B2
(45) Date of Patent: Jan. 19, 2016

(54) REDUCTION PROCESSING APPARATUS FOR STEEL-MAKING SLAG AND REDUCTION PROCESSING SYSTEM FOR STEEL-MAKING SLAG

(71) Applicant: NIPPON STEEL & SUMITOMO METAL CORPORATION, Tokyo (JP)

(72) Inventors: Toshiya Harada, Tokyo (JP); Takashi Arai, Tokyo (JP); Hiroki Fukumura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/353,961

(22) PCT Filed: Jun. 27, 2013

(86) PCT No.: PCT/JP2013/067675
§ 371 (c)(1),
(2) Date: Apr. 24, 2014

(87) PCT Pub. No.: WO2014/003127
PCT Pub. Date: Jan. 3, 2014

(65) Prior Publication Data
US 2014/0291901 A1  Oct. 2, 2014

(30) Foreign Application Priority Data

Jun. 27, 2012  (JP) .................. 2012-144473
Jun. 27, 2012  (JP) .................. 2012-144557
Oct. 25, 2012  (JP) .................. 2012-235692

(51) Int. Cl.
C21C 5/52   (2006.01)
C21C 7/00   (2006.01)
(Continued)

(52) U.S. Cl.
CPC ............. C21C 7/0087 (2013.01); C04B 5/06 (2013.01); C21C 5/527 (2013.01); C21C 5/5229 (2013.01);
(Continued)

(58) Field of Classification Search
CPC .................. F27D 15/00; C21C 5/5229
USPC ...................... 373/79–81; 266/242
See application file for complete search history.

(56) References Cited

U.S. PATENT DOCUMENTS 3,342,250 A  9/1967  Treppschuh et al.
3,905,589 A  9/1975  Schempp et al.
(Continued)

FOREIGN PATENT DOCUMENTS

AU  20553/95 B    12/1995
CA  2534623 A1    3/2006
(Continued)

OTHER PUBLICATIONS

Japanese Notice of Allowance, dated Apr. 8, 2014, for Japanese Application No. 2013-550690, with English translation.
(Continued)

*Primary Examiner* — Scott Kastler
(74) *Attorney, Agent, or Firm* — Birch, Stewart, Kolasch & Birch, LLP (57) ABSTRACT

This reduction processing apparatus for a steel-making slag that continuously performs reduction processing to a hot steel-making slag by using an electric furnace includes: a slag-supplying container that charges the hot steel-making slag into the electric furnace; an electrode that is provided at the electric furnace and heats a molten slag layer on a molten iron produced by reducing the hot steel-making slag; an auxiliary-raw-material supplying unit that supplies an auxiliary-raw-material including a reducing agent to the molten slag layer; and a tilting unit that tilts the slag-supplying container and adjusts a charging amount of the hot steel-making slag to the electric furnace.

5 Claims, 5 Drawing Sheets

(51) Int. Cl.
  *F27D 15/00* (2006.01)
  *F27D 3/14* (2006.01)
  *C04B 5/06* (2006.01)
  *F27B 3/18* (2006.01)
  *F27B 19/04* (2006.01)

(52) U.S. Cl.
  CPC .............. *F27B 3/183* (2013.01); *F27B 19/04* (2013.01); *F27D 3/14* (2013.01); *F27D 15/00* (2013.01); *C21C 2005/5235* (2013.01); *C21C 2300/04* (2013.01)

(56) References Cited

U.S. PATENT DOCUMENTS

| | | | |
|---|---|---|---|
| 4,094,495 A | | 6/1978 | Kutscher et al. |
| 4,149,024 A | * | 4/1979 | Stenkvist et al. ............. 373/107 |
| 4,199,350 A | | 4/1980 | Kutscher et al. |
| 4,274,867 A | | 6/1981 | Bardenheuer et al. |
| 4,328,388 A | * | 5/1982 | Longenecker ................. 373/80 |
| 4,641,319 A | | 2/1987 | Nagai et al. |
| 4,650,510 A | | 3/1987 | Tuovinen |
| 4,740,989 A | | 4/1988 | Steipe et al. |
| 5,173,920 A | * | 12/1992 | Bochsler et al. ................ 373/72 |
| 5,238,484 A | | 8/1993 | Pirklbauer et al. |
| 5,715,272 A | | 2/1998 | Kaell et al. |
| 5,851,263 A | | 12/1998 | Bernet et al. |
| 6,549,558 B1 | | 4/2003 | Okada et al. |
| 6,748,004 B2 | | 6/2004 | Jepson |
| 7,597,736 B2 | | 10/2009 | Fleischanderl et al. |
| 2001/0046251 A1 | | 11/2001 | Vallomy |
| 2002/0001332 A1 | | 1/2002 | Shver |
| 2003/0140732 A1 | | 7/2003 | Edlinger |
| 2006/0065071 A1 | | 3/2006 | Fleischanderl et al. |
| 2009/0249919 A1 | | 10/2009 | Degel et al. |

FOREIGN PATENT DOCUMENTS

| | | |
|---|---|---|
| CN | 1829891 A | 9/2006 |
| DE | 3543987 A1 | 7/1986 |
| DE | 102006052181 A1 | 5/2008 |
| EP | 1870479 A2 | 12/2007 |
| JP | 52-33897 A | 3/1977 |
| JP | 57-177911 A | 11/1982 |
| JP | 9-87728 A | 3/1997 |
| JP | 2001-152233 A | 6/2001 |
| JP | 2002-54812 A | 2/2002 |
| JP | 2002-69520 A | 3/2002 |
| JP | 2002-69526 A | 3/2002 |
| JP | 2003-520899 A | 7/2003 |
| JP | 2005-195224 A | 7/2005 |
| JP | 2006-528732 A | 7/2005 |
| JP | 2007-131928 A | 5/2007 |
| JP | 2008-49206 A | 3/2008 |

OTHER PUBLICATIONS

Written Opinion of the International Searching Authority, dated Sep. 10, 2013, for International Application No. PCT/JP2013/067660.
Written Opinion of the International Searching Authority, dated Sep. 10, 2013, for International Application No. PCT/JP2013/067665.
International Search Report, mailed Oct. 1, 2013, issued in PCT/JP2013/067675.
International Search Report, mailed Sep. 10, 2013, issued in PCT/JP2013/067660.
International Search Report, mailed Sep. 10, 2013, issued in PCT/JP2013/067665.
Written Opinion of the International Searching Authority, mailed Oct. 1, 2013, issued in PCT/JP2013/067675.
Ye et al., "Reduction of steel-making slags for recovery of valuable metals and oxide materials", Scandinavian Journal of Metallurgy 2003; vol. 32, pp. 7-14.
U.S. Office Action, issued Apr. 24, 2015, for U.S. Appl. No. 14/352,925.
U.S. Office Action, issued Mar. 23, 2015, for U.S. Appl. No. 14/352,529.
Chinese Office Action, dated Nov. 26, 2014, for Chinese Application No. 201380003875.0, with an English translation.
Extended European Search Report for European Application No. 13808713.5, dated Jun. 19, 2015.
Extended European Search Report for European Application No. 13809399.2, dated Jun. 17, 2015.
Korean Notice of Allowance for Korean Application No. 10-2014-7012214, dated Jul. 13, 2015, with an English translation.
U.S. Office Action for U.S. Appl. No. 14/352,925, dated Aug. 25, 2015.

* cited by examiner

REDUCTION PROCESSING APPARATUS FOR STEEL-MAKING SLAG AND REDUCTION PROCESSING SYSTEM FOR STEEL-MAKING SLAG

TECHNICAL FIELD

The present invention relates to a reduction processing apparatus and a reduction processing system for a steel-making slag that apply reduction processing in the industrial scale to the slag (steel-making slag) generated during steel making, and recover valuable components while modifying properties of the steel-making slag so as to conform to various applications.

The present application claims priority based on Japanese Patent Application No. 2012-144473 filed in Japan on Jun. 27, 2012, Japanese Patent Application No. 2012-144557 filed in Japan on Jun. 27, 2012, and Japanese Patent Application No. 2012-235692 filed in Japan on Oct. 25, 2012, the disclosures of which are incorporated herein by reference in their entirety.

BACKGROUND ART

During the steel making processes, a large amount of steel-making slag is generated. Although the steel-making slag contains, for example, P and metal components such as Fe and Mn, it also contains a large amount of CaO, which leads to expansion and collapse. This has restricted the steel-making slag to be used as, for example, a material for roadbed or aggregate. However, in recent years, resources have been increasingly recycled, and a large number of methods for recovering the valuable substances from the steel-making slag has been disclosed.

Patent Document 1 discloses a method of processing iron and steel slag, which includes adding iron and steel slag generated during melting and making iron and steel, to molten iron and steel liquid in the smelting furnace, further adding heat and reducing agents, moving Fe, Mn, and P to the molten liquid while altering the iron and steel slag to obtain altered slag, and then, moving Mn and P in the molten liquid into the slag. However, this processing method requires batch processing to be continuously applied several times until a slag with predetermined components can be obtained, and hence, results in poor working efficiency.

Patent Document 2 discloses a method, which includes: supplying steel slags having iron oxide contents of more than 5 wt % onto a steel bath having a carbon content of less than 1.5 wt %; then introducing carbon or carbon carriers to carbonize the steel bath to obtain the steel bath having a carbon content of more than 2.0 wt %; and then performing reduction processing.

However, with the method described in Patent Document 2, the concentration of C (carbon concentration) in the molten iron is set to less than 1.5 wt % at the time of inserting the molten slag to suppress the discharge of the large amount of gas, and the concentration of C is increased to more than 2.0 wt % at the time of performing smelting reduction, thereby performing desired reduction. Thus, a process of de-carbonization in conjunction with an increase in temperatures and a process of addition of carbon for reduction are repeated, which results in batch processing. As a result, working efficiency deteriorates. It should be noted that, since the method described in Patent Document 2 increases the concentration of C to more than 2.0 wt % at the time of performing the reduction processing, it is considered that this method promotes the reduction reaction mainly through the reaction between slag and metal.

Further, in the method described in Patent Document 2, the carbon material is used as the heat source as well as the reducing agent, and hence, the amount of exhaust gas increases. Thus, it is assumed that the thermal efficiency deteriorates, and the amount of dust generated increases.

Non-Patent Document 1 discloses results of reduction tests in which steel-making slag powder, carbon material powder, and slag-modifying agent powder are inserted through a hollow electrode into an electric furnace. However, in the reduction tests described in Non-Patent Document 1, the test is performed in an electric furnace by processing the cold steel-making slag, which has been solidified and crushed, and hence, the energy-consumption rate is large.

Further, Patent Document 3 discloses a technique of recovering valuable metals by reducing molten slags generated during smelting of non-ferrous metals using carbonaceous reducing agents in an open-type direct-current electric furnace to separate it into a metal phase and a slag phase. However, the method described in Patent Document 3 also involves a batch process with an electric furnace using the cold slag as the target of the processing, and hence, the energy-consumption rate is large.

As described above, these methods of recovering valuable components from the slags each have a problem of poor working efficiency or large energy-consumption rate.

RELATED ART DOCUMENTS

Patent Document

Patent Document 1: Japanese Unexamined Patent Application, First Publication No. S52-033897

Patent Document 2: Published Japanese Translation No. 2003-520899 of the PCT International Publication Patent Document 3: Australia Patent No. AU-B-20553/95

Non-Patent Document

Non-Patent Document 1: Scandinavian Journal of Metallurgy 2003; 32: p.7-14

DISCLOSURE OF THE INVENTION

Problems to be Solved by the Invention

As described above, with the conventional method that recycles the hot steel-making slag through batch processing, the working efficiency is poor. With the conventional method that recycles the cold steel-making slag as resources through melting, there is a problem of the high energy-consumption rate.

Then, the object of the present invention is to provide, as a measure with a favorable working efficiency and reduced energy-consumption rate, a reduction processing apparatus and a reduction processing system for a steel-making slag that apply reduction processing to the steel-making slag, and recover valuable components while modifying properties of the steel-making slag so as to conform to various applications.

Means for Solving the Problem

The following is the summary of the present invention.
(1) A first aspect of the present invention is a reduction processing apparatus for a steel-making slag that continuously performs reduction processing to a hot steel-making slag by using an electric furnace, the apparatus including: a slag-supplying container that charges the hot steel-making slag into the electric furnace; an electrode that is provided at the electric furnace and heats a molten slag layer on a molten iron produced by reducing the hot steel-making slag together with the molten iron; an auxiliary-raw-material supplying unit that supplies an auxiliary-raw-material including a reducing agent to the molten slag layer; and a tilting unit that tilts the slag-supplying container and adjusts a charging amount of the hot steel-making slag to the electric furnace.
(2) In the reduction processing apparatus for a steel-making slag as described in the above (1), the electric furnace may be a closed-type electric furnace which is a fixed type.
(3) In the reduction processing apparatus for a steel-making slag as described in the above (2), the closed-type electric furnace may be a direct-current electric furnace.
(4) In the reduction processing apparatus for a steel-making slag as described in any one of the above (1) to (3), the auxiliary-raw-material supplying unit may be an auxiliary-raw-material supplying tube which is provided in the electrode.
(5) In the reduction processing apparatus for a steel-making slag as described in any one of the above (1) to (4), the slag-supplying container may be provided with an exhausting portion that discharges exhaust gas from the electric furnace.
(6) A second aspect of the present invention is a reduction processing system for a steel-making slag by using the reduction processing apparatus as described in the above (1), the system including: a measuring unit that measures electric power supplied to the electrode; a calculation unit that calculates an amount of the hot steel-making slag to be reduced based on the measured electric power, and then calculates a predetermined amount of reducing agent based on the calculated amount of the hot steel-making slag to be reduced; and a control unit that controls a tilting angle of the slag-supplying container by actuating the tilting unit such that an amount of the hot steel-making slag charged into the electric furnace follows the amount of the hot steel-making slag to be reduced, and controls an amount of the auxiliary-raw-material supplied from the auxiliary-raw-material supplying unit so as to supply the predetermined amount of the reducing agent.

Effects of the Invention

According to the aspect described above, it is possible to modify, with a reduced energy-consumption, the steel-making slag into a material that can be used for various applications such as a cement raw material, a civil engineering material, and a ceramic products, and recover the valuable elements such as Fe, Mn, and P into the molten iron. Further, it is possible to recycle Fe and Mn into the steel-making processes, and use P as a phosphate fertilizer or phosphoric acid material by applying oxidation treatment.

EMBODIMENTS OF THE INVENTION

Considering the measure that provides favorable working efficiency and reduced energy-consumption rate, which is the object of the present invention, it is effective to use the hot steel-making slag (hereinafter, also referred to as a steel-making slag) from the viewpoint of reducing the energy-consumption rate. However, when the hot steel-making slag is charged onto the molten iron in the electric furnace, there occurs a phenomenon (slag foaming) that the hot steel-making slag rapidly reacts with the molten iron and suddenly boils, and the slag may spill over from the electric furnace if this phenomenon strongly occurs (overflow).

As described above, in the method described in Patent Document 2, this rapid boiling phenomenon is avoided by "slowing the reaction speed by decreasing the concentration of C in the molten iron." However, with this method, the working efficiency deteriorates.

More specifically, in the present invention, a similar problem arises as a problem to be solved, and C in the molten iron reduces FeO in the slag in a reduction furnace such as a converter, which promotes reduction reaction through reaction between the slag and the metal. Thus, in order to improve the ability to reduce, it is necessary to repeat de-carbonization and carbonization, which results in deteriorated working efficiency. Accordingly, only the reduction of the concentration of C is insufficient as a countermeasure.

In view of the facts described above, the present inventors made a keen study, and newly found through experiments that, during the reduction reaction in the electric furnace, a reaction between FeO and C in the slag more predominantly occurs, rather than a reaction between the slag and the metal. Then, it was found that, by using reduced C concentration of approximately 1.5 mass %, it is possible to perform the reduction processing of the slag without the need of carbonizing, although the ability to reduce is slightly lower, and with this method, it is possible to improve the working efficiency.

Thus, by using the electric furnace, it is possible to suppress the slag foaming, which suddenly occurs at the time of charging the hot steel-making slag, and the above-described method can be one of the measures for preventing the slag from overflowing.

However, there is a possibility that the concentration of C in the molten iron is high. Thus, a study was also made on a method that provides favorable working efficiency while reducing the energy-consumption rate, even if the concentration of C in the molten iron is high. Then, the present inventors made experiments to realize a reduction processing apparatus and a reduction processing system for a steel-making slag that can solve the above-mentioned problem, by using the electric furnace.

As a result, regarding a specific measure for preventing overflow at the time of supplying hot steel-making slag, which has fluidity while hot, directly into the electric furnace, it was discovered through experiments that, from the viewpoint of suppressing the phenomenon of sudden boiling of the molten slag while avoiding the overflow, it is preferable to employ the following two methods:

(a) temporarily place the hot steel-making slag, having fluidity while hot, in a device capable of adjusting the amount of flow of it into the electric furnace, and then, charge the hot steel-making slag into the electric furnace while adjusting the amount of flow of it into the electric furnace so as not to overflow the hot steel-making slag in the electric furnace; and (b) pre-form a molten slag layer, preferably an inactive molten slag layer (reduced slag layer) serving as a buffer zone on the molten iron, and then, flow the hot steel-making slag onto the buffer zone.

Further, it was also discovered that it is more preferable for suppressing overflow to employ, in addition to the methods (a) and (b) described above:

(c) supply, in advance, a carbon material to the molten slag in an excessively suspended manner; and (d) reduce the concentration of C in the molten iron to not more than 3 mass % (provided that strong reduction is not necessary).

The present invention is based on a technical idea that the energy-consumption rate can be lowered by performing the reduction processing during the time when the steel-making slag is hot and has fluidity.

More specifically, the present inventors reached an idea that it is possible to utilize, as resources, steel-making slag generated in the steel-making processes with reduced energy-consumption rate, by charging the steel-making slag into the electric furnace during the time when it is hot and has fluidity to reduce the steel-making slag, recovering valuable components, and modifying the slag.

Below, a reduction processing apparatus 100 for a steel-making slag according to a first embodiment of the present invention will be described.

The steel-making slag (hot steel-making slag 6'), to which the reduction processing apparatus 100 for the steel-making slag according to this embodiment is directed, is only necessary to be slag generated during the steel-making processes, and is not limited to specific slag.

In addition, it is only necessary for the hot steel-making slag 6' to have fluidity sufficient to continuously or intermittently flow into the electric furnace 1, and it is not necessary for the hot steel-making slag 6' to be in the completely melted state. The rate of solid phase in the hot steel-making slag 6' is not specifically limited. However, slag involves fluidity sufficient to flow into the electric furnace 1 when the rate of solid phase of the hot steel-making slag 6' is not more than approximately 30% at approximately 1400° C. Note that the rate of solid phase can be calculated using a commercially available software.

Figure 1:
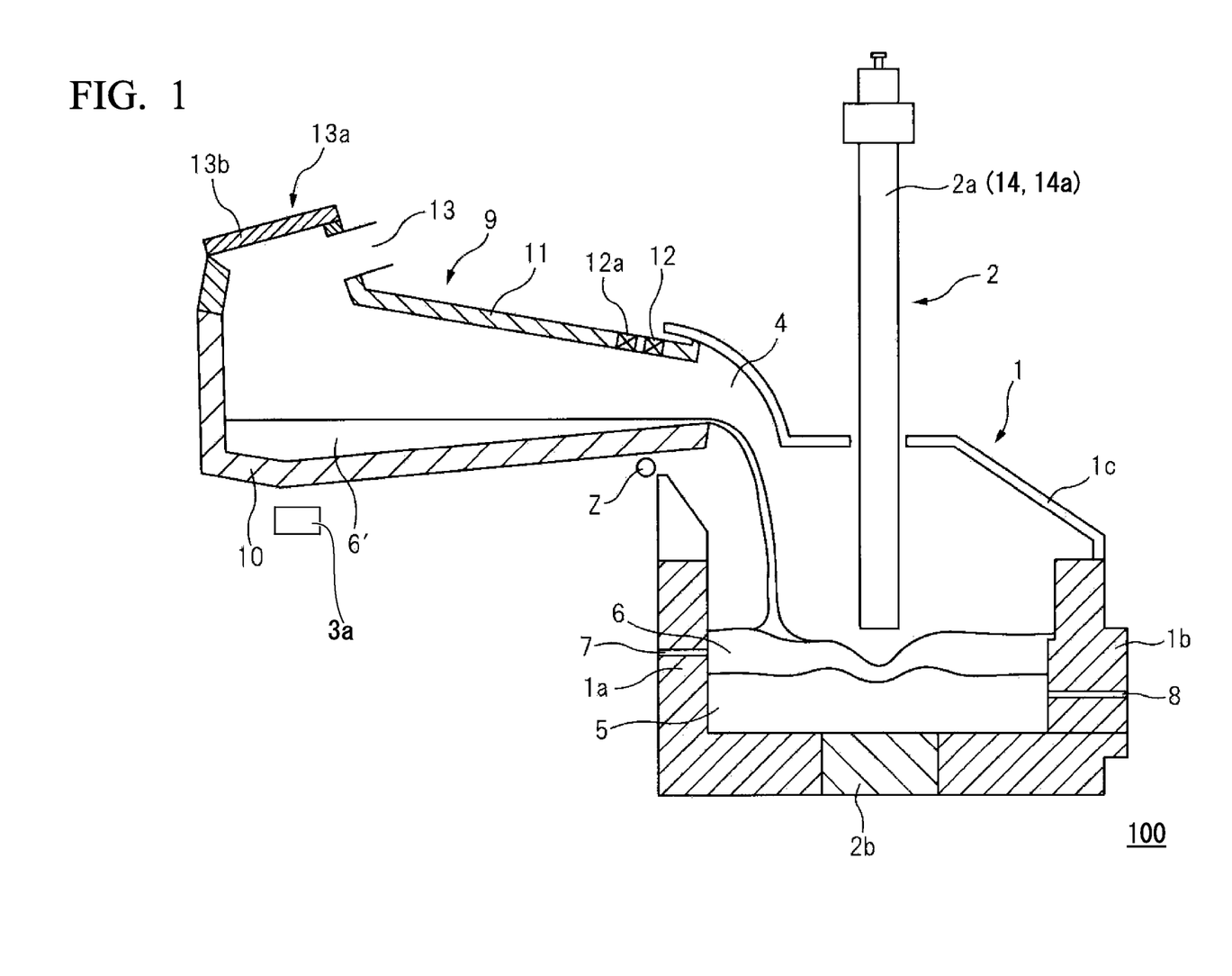
FIG. 1 is a schematic view illustrating a reduction processing apparatus 100 for a steel-making slag according to a first embodiment of the present invention.

Below, the explanation is made on the basis of the drawings. FIG. 1 illustrates a reduction processing apparatus 100 for a steel-making slag according to a first embodiment of the present invention which includes an electric furnace 1 and a slag-supplying container 9 which is provided with a tilting unit 3a, The electric furnace 1 is, for example, a fixed-type and closed-type direct-current electric furnace, and is provided with electrode 2 formed by an upper electrode 2a and a furnace bottom electrode 2b that are paired in the vertical direction. On the bottom portion of the electric furnace 1, the molten iron 5 is accommodated, and on the molten iron 5, there formed a layer of the molten slag 6 (molten slag layer) including a hot steel-making slag 6' supplied from the slag-supplying container 9. The molten slag layer is heated together with the molten iron 5 by the electrode 2.

In this embodiment, an auxiliary-raw-material supplying unit 14 which supplies an auxiliary-raw-material including a reducing agent to the molten slag layer is provided in the upper electrode 2a as an auxiliary-raw-material supplying tube 14a.

On the left of the furnace ceiling 1c of the electric furnace 1, a slag-supplying unit 4 is provided which supplies the hot steel-making slag 6' having fluidity while hot from the slag-supplying container 9. Once the external air (oxygen or oxygen-containing gas) enters the electric furnace 1, oxidation reaction occurs on the surface of the molten slag layer, and the "Total Fe" in the molten slag layer increases, which leads to a decrease in the reduction performance.

Figure 2:
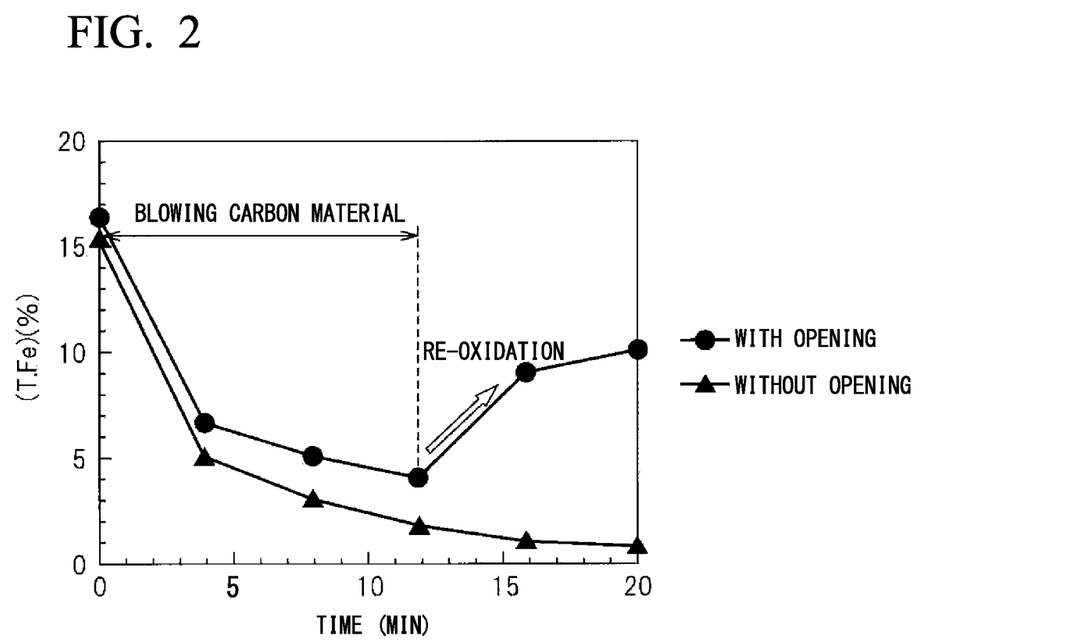
FIG. 2 is a comparative diagram illustrating changes in the "total Fe" in the molten slag in the electric furnaces 1 with or without the opening portion.

FIG. 2 comparatively illustrates changes with time in the "total Fe" (mass %) in the molten slag 6 in the electric furnaces 1 with or without the opening portion at the furnace wall.

By blowing the reducing agent (carbon material) into the electric furnace 1 to subject the molten slag 6 to reduction processing, the "total Fe" in the molten slag 6 reduces (see the duration for "BLOWING CARBON MATERIAL" in the drawing). However, with the opening portion at the furnace wall of the electric furnace 1, an air is suctioned and the inside of the electric furnace 1 becomes an oxidizing environment, whereby the surface of the molten slag 6 is re-oxidized. Accordingly, after the blowing of the reducing agent (carbon material) ends, the "total Fe" in the molten slag 6 increases due to the re-oxidation.

On the other hand, in the case where the opening portion is not provided at the furnace wall of the electric furnace 1, the inside of the electric furnace 1 is maintained to be the reducing atmosphere. Thus, the re-oxidation does not occur at the surface of the molten slag 6, and the reduction reaction of FeO advances due to C in the molten slag 6 and the molten iron 5, whereby the "total Fe" in the molten slag 6 reduces, which makes it possible to maintain a predetermined low "Total Fe". Accordingly, it is preferable for the electric furnace 1 to be formed in a closed type with which the external air does not enter.

In addition, in the slag-supplying container 9, an exhausting portion 13 is disposed to the slag-supplying container 9 so as to configure an exhaust path of the electric-furnace exhaust gas.

The inside of the electric furnace 1 is a reducing atmosphere containing the primary component formed by CO gas generated through the reduction reaction and $H_2$ generated from reducing agents supplied (carbon material). If the slag-supplying container 9 is configured as the exhaust path of the electric-furnace exhaust gas, the reducing atmosphere can be maintained, thus, it is possible to prevent oxidation reaction from occurring at the surface of the molten slag layer.

The electric furnace 1 has a furnace side wall 1a provided with a cinder notch 7 that discharges the molten slag 6 to a slag ladle (not illustrated). In addition, the electric furnace 1 has a furnace side wall 1b disposed on the other side of the furnace side wall 1a of the electric furnace 1 and provided with a tap hole 8 that is located at the level (height) lower than the cinder notch 7 and discharges the molten iron 5 to a molten-iron trough (not illustrated). To prevent the furnace side wall 1a and the furnace side wall 1b from damaging by melting, it is preferable that the cinder notch 7 and the tap hole 8 are not disposed close to each other on the same furnace side wall, and it is only necessary that they are spaced apart in a distance that can prevent the furnace side wall 1a and the furnace side wall 1b from damaging by melting.

Note that the furnace side wall 1a, the furnace side wall 1b, and a furnace ceiling 1c are cooled by jacket or water spraying (not illustrated).

The electric furnace 1 may be provided with a raw-material supplying unit (not illustrated) that supplies iron materials such as small scrap iron and direct reduced iron (DRI) into the electric furnace 1. The electric furnace 1 can produce the molten iron 5 by melting and reducing the small scrap iron, reduced iron, powder dusts, and the like.

Figure 3:
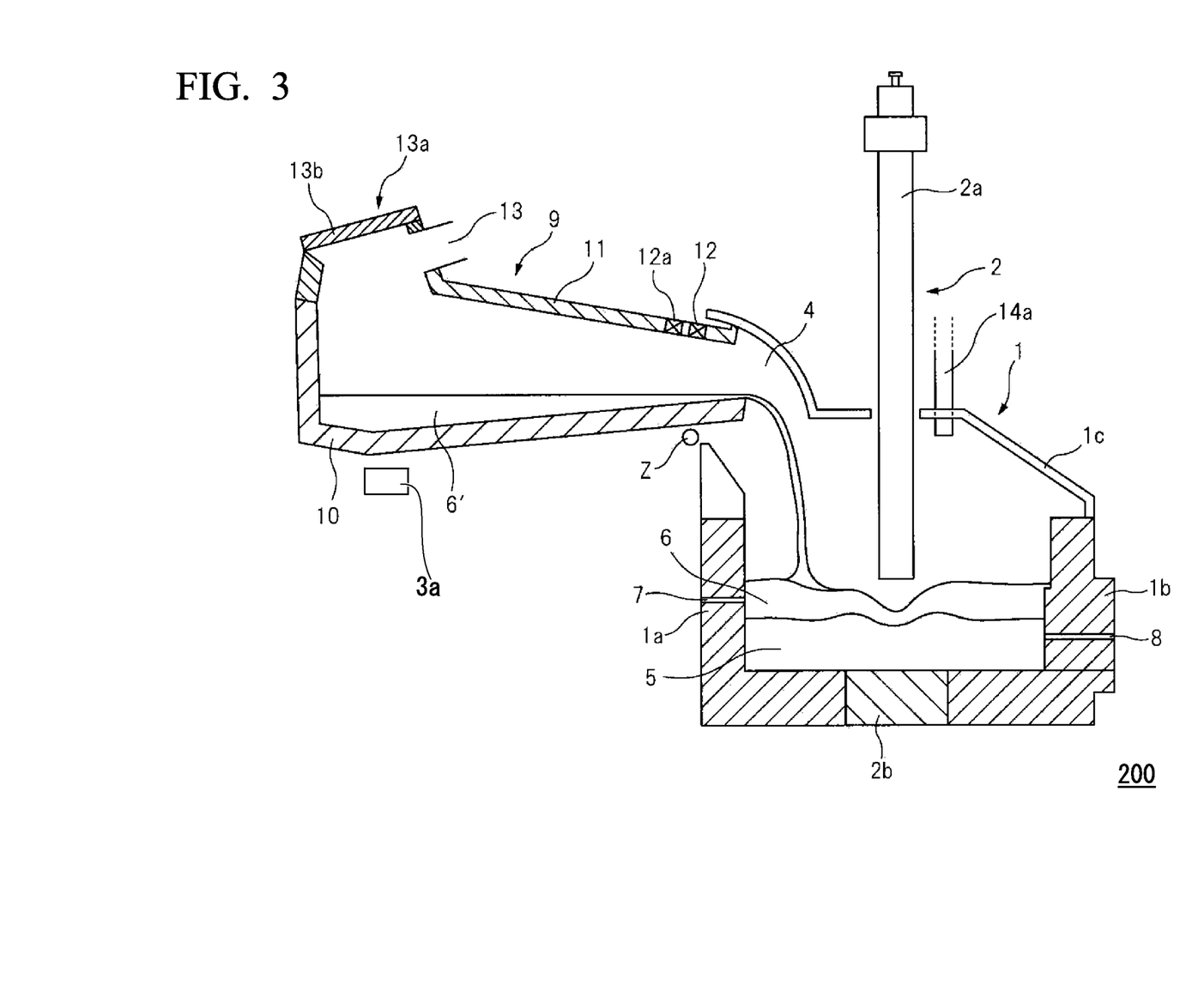
FIG. 3 is a schematic view illustrating a reduction processing apparatus 200 for a steel-making slag according to a second embodiment of the present invention.

The electric furnace 1 is provided with an auxiliary-raw-material supplying unit 14 that supplies reducing agents necessary for reduction, and auxiliary-raw-materials such as modifying powder that modify properties of the molten slag 6. This auxiliary-raw-material supplying unit 14 may be, as shown in FIG. 3 which illustrates a reduction processing apparatus 200 for a steel-making slag according to a second embodiment of the present invention, an auxiliary-raw-material supplying tube 14a disposed through the furnace ceiling 1c of the electric furnace 1 in a manner that the auxiliary-raw-material supplying tube 14a penetrates the furnace ceiling 1c. By supplying the auxiliary-raw-materials (for example, reducing agents and modifying powder) from the auxiliary-raw-material supplying tube 14a into the electric furnace 1, the amount of gas generated in the electric furnace 1 is reduced. Hence, the auxiliary-raw-materials fall with the force of gravity onto the surface of the molten slag 6, and are mixed with the molten slag 6.

Further, as illustrated in FIG. 1, it may be possible to form the upper electrode 2a of the electrode 2 so as to be a hollow electrode, and use the hollow portion as the auxiliary-raw-material supplying tube 14a. By using the hollow electrode, it is possible to directly blow the auxiliary-raw-materials (for example, reducing agent and modifying powder) into the arc spot.

Figure 4:
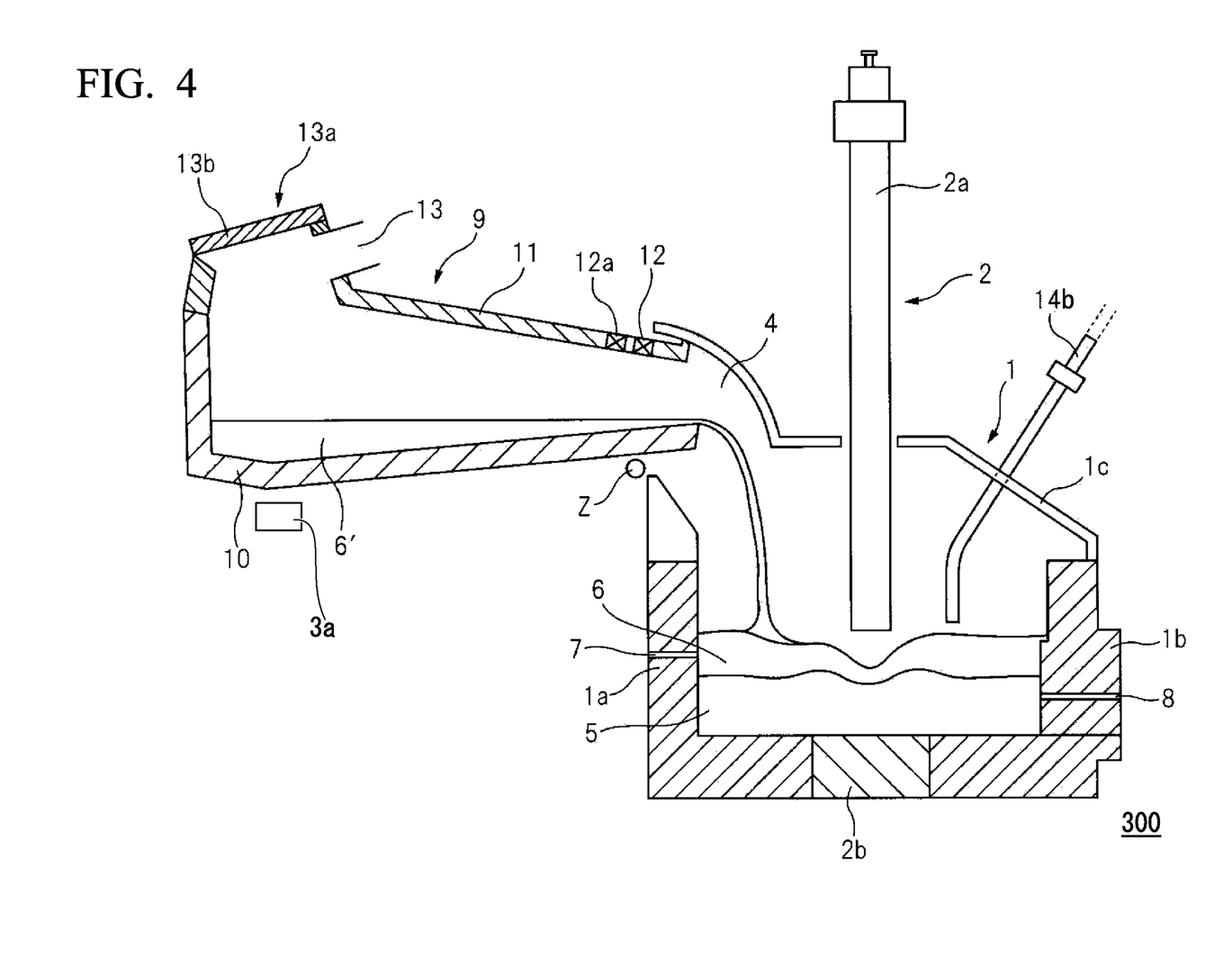
FIG. 4 is a schematic view illustrating a reduction processing apparatus 300 for a steel-making slag according to a third embodiment of the present invention.

Further, as shown in FIG. 4 which illustrates a reduction processing apparatus 300 for a steel-making slag according to a third embodiment of the present invention, the electric furnace 1 may be provided with a lance 14b for blowing an auxiliary-raw-material, to supply, into the electric furnace 1, powders (auxiliary-raw-material) that are more likely to spatter without using a hollow portion of the hollow electrode or the auxiliary-raw-material supplying tube 14a. In a configuration illustrated in FIG. 4, the electric furnace 1 is provided with the lance 14b for blowing an auxiliary-raw-material disposed through the furnace ceiling 1c in a manner that penetrates the furnace ceiling 1c.

In the reduction processing apparatus 200 for a steel-making slag as shown in FIG. 3, the auxiliary-raw-material supplying tube 14a is disposed near the electrode 2, however, the auxiliary-raw-material supplying tube 14a may be disposed at a position apart from the electrode 2.

In addition, the auxiliary-raw-material supplying tube 14a may be provided at the furnace ceiling 1c of the electric furnace 1 together with a lance 14b for blowing an auxiliary-raw-material.

<Slag-supplying Container>

The slag-supplying container 9 (see FIG. 1, FIG. 3, and FIG. 4) is configured by an upper wall 11 and a bottom wall 10, and is provided with an opening portion 13a that receives a hot steel-making slag 6' supplied and a lid 13b that closes the opening portion 13a. On the slag-supplying container 9, an exhausting portion 13 may be provided. It is preferable to make the bottom wall 10 of the slag-supplying container 9 out of refractory lining wall, and make the upper wall 11 out of a water-cooled refractory lining wall.

The slag-supplying container 9 can be tilted at a given angle with the tilting axis z being a center. Accordingly, it is possible to control the amount of inflow of the hot steel-making slag 6' to the electric furnace 1 from the slag-supplying unit 4 connected to the electric furnace 1.

In the case where the slag-supplying container 9 includes an exhausting portion 13, and the exhausting portion 13 is connected to the dust collector (not illustrated), the atmosphere in the slag-supplying container 9 can be constantly set to be under negative pressure, which is preferable. In this negative pressure state, the high temperature exhaust gas including CO gas and $H_2$ gas generated in the electric furnace 1 enters from the slag-supplying unit 4 into the slag-supplying container 9, and is discharged, through the inside of the slag-supplying container 9 serving as an exhaust path, from the exhausting portion 13 to the dust collector (not illustrated) via an exhausting gas duct (not illustrated).

In this configuration, even if an external air enters from a gap between the slag-supplying container 9 and a connecting portion of the electric furnace 1, the external air entered flows into the inside of the slag-supplying container 9, thus, the atmosphere in the electric furnace 1 is constantly maintained to be a high-temperature reducing atmosphere. On the other hand, the inside of the slag-supplying container 9 is maintained to be a high-temperature reducing atmosphere as same as the inside of the electric furnace 1, thus, the temperature of the hot steel-making slag 6' is maintained, and the hot steel-making slag 6' is not oxidized.

The slag-supplying container 9 may be provided with a nozzle 12 that blows oxygen or oxygen-containing gas into the electric-furnace exhaust gas including CO and $H_2$. If the electric-furnace exhaust gas is burnt in the slag-supplying container 9, it is possible to maintain the inside of the slag-supplying container 9 to be high temperatures, which is preferable. This makes it possible to avoid the hot steel-making slag 6' from being solidified and the adhesion of the steel-making slag 6' to the furnace walls of the slag-supplying container 9. Further, it is possible to make the steel-making slag 6' have fluidity necessary for the hot steel-making slag 6' to be charged into the electric furnace 1.

Even when the sensible heat or combustion heat of the exhaust gas is used, there is a case in which the temperature in the slag-supplying container 9 does not reach the temperature at which the hot steel-making slag does not adhere to the furnace wall of the slag-supplying container 9. For such a case, the slag-supplying container 9 may be provided with a burner 12a so as to emit flame in the slag-supplying container 9.

Further, the slag-supplying container 9 may be provided with a slag modifying agent adding unit (not illustrated) that adds, to the hot steel-making slag 6', a slag modifying agent for modifying the hot steel-making slag 6' in the slag-supplying container 9. In addition, the slag modifying agent may be charged, through the burner 12a into the slag-supplying container 9 in a molten form.

The slag-supplying container 9 is provided with a tilting unit 3a that controls the amount of the hot steel-making slag charged into the electric furnace 1 by tilting the slag-supplying container 9 with a tilting axis z being the center.

Below, explanation is made with respect to the charging of the hot steel-making slag 6' into the electric furnace 1 using the slag-supplying container 9.

<Charging of Hot Steel-making Slag>

First, a measure (a) will be described below.

(a) The hot steel-making slag having fluidity while hot is temporarily held in a device that can adjust the amount of inflow into the electric furnace 1, and then, is charged while the amount of inflow into the electric furnace 1 is being adjusted in a manner such that the hot steel-making slag having fluidity while hot does not overflow in the electric furnace 1.

An appropriate amount of the molten iron 5 (for example, 100 to 150 tons) is contained in advance as hot metal in the electric furnace 1. Then, the hot steel-making slag 6' in the amount that can be reduced with respect to the rate of the electric power supplied to the electric furnace 1 is charged from the slag-supplying container 9 onto the molten slag 6 on the molten iron 5 to continuously maintain the molten slag layer.

In the reduction processing apparatus 100, 200, 300 for a steel-making slag, it is possible to freely select the mode of charging the hot steel-making slag 6' into the electric furnace 1, by actuating the tilting unit 3$a$, and adjusting the tilting angle of the slag-supplying container 9 with the tilting axis z being the center.

In other words, using the tilting unit 3$a$, the slag-supplying container 9 is tilted with the tilting axis z being the center, whereby the hot steel-making slag 6' supplied from the slag pot (not illustrated) is stored and held, and the hot steel-making slag 6' stored is continuously or intermittently charged to the layer of the molten slag 6 on the molten iron 5 in the electric furnace 1 while adjusting the charging amount so as not to overflow from the electric furnace 1 due to the foaming of the molten slag 6.

It should be noted that the hot steel-making slag 6' is temporarily stored and held in the slag-supplying container 9. However, in the case where the amount of supply from the slag pot is small and the steel-making slag 6' does not need to be temporarily stored and held in the slag-supplying container 9, it may be possible to fix the slag-supplying container 9 at constant angles and use it as the slag runner.

By tilting the slag-supplying container 9 to charge the hot steel-making slag 6' into the electric furnace 1, the high-temperature surface layer of the hot steel-making slag 6' in the slag-supplying container 9 is updated, whereby thermal efficiency to the hot steel-making slag 6' remaining in the slag-supplying container 9 improves.

In the case where the hot steel-making slag 6' is intermittently charged into the electric furnace 1, it may be possible to employ:
(i) a mode in which the hot steel-making slag 6' is charged in a manner such that charging and stopping are repeated, or
(ii) a mode in which a predetermined amount of the hot steel-making slag 6' is collectively charged at predetermined intervals of time.

If the charging rate is too fast at the time of charging the hot steel-making slag 6' into the electric furnace 1, the amount of gas generated temporarily increases, and the slag becomes in a slag foaming state, possibly leading to an abnormal state such as spillover (overflow) from the electric furnace 1. In such a case, it is preferable to reduce the tilting angle of the slag-supplying container 9 so as to temporarily stop charging the hot steel-making slag 6' into the electric furnace 1, or increase the rate at which the reducing agents are supplied.

When the hot steel-making slag 6' is charged into the electric furnace 1, it is preferable to detect whether the molten slag layer strongly foams (slag foaming) and abnormality such as overflow occurs, for example, by always:
(1) monitoring the inside and outside of the furnace using a monitor camera;
(2) monitoring the behavior of the hot steel-making slag using a sound meter; or
(3) monitoring the surface level of the molten slag by radiating microwave.

If the results appear to exceed a threshold value, it is preferable to adjust the amount of the hot steel-making slag charged into the electric furnace 1.

To prevent the slag foaming from occurring in the molten slag 6 and prevent the molten slag 6 from spilling over (overflowing) the electric furnace I, there is a measure (b) as described below, other than the measure (see the measure (a) described above) of adjusting the amount of the hot steel-making slag 6' charged from the slag-supplying container 9. Accordingly, the measures (a) and (b) may be used at the same time.

(b) By causing reduced slag to exist as slag located on the molten iron 5, it is possible to make it function as a buffer zone. This makes it possible to dilute and lower the concentration of FeO in the hot steel-making slag 6' to be charged, and reduce the possibility that the hot steel-making slag 6' and the molten iron 5 are brought into contact with each other.

In other words, by causing the molten slag 6 obtained after reduction processing to exist as a buffer zone on the surface of the molten iron 5, it is possible to reduce the concentration of "FeO" in this molten slag 6 and reduce the possibility that the molten slag 6 and the molten iron 5 are brought into contact with each other, which makes it possible to prevent the molten slag 6 from foaming. As a result, it is possible to prevent the molten slag 6 from overflowing from the electric furnace 1.

The amount of inflow of the hot steel-making slag 6' into the electric furnace 1 is basically determined according to the amount of electric power supplied to the electrode 2. In other words, the amount of inflow of the hot steel-making slag 6' continuously or intermittently charged is calculated on the basis of the unit electric power consumption necessary for the steel-making slag reduction processing and the amount of electric power actually supplied.

The rate of charging the hot steel-making slag 6' needs to accord with the rate of electric power supplied to the electrode 2 in the long term, but does not need to accord with the rate of electric power supplied to the electrode 2 in the short term. This is because, in the case where a predetermined amount of the hot steel-making slag 6' is intermittently charged into the electric furnace 1, the amount of inflow does not accord with the rate of electric power supplied to the electrode 2 in the short term. In this case, it may be accorded with the rate of electric power supplied, in the long term.

It should be noted that the electric power consumption rate necessary for the reduction processing applied to the hot steel-making slag can be obtained through heat balance calculation in which heat of reaction and heat radiation are taken into consideration. However, the electric power consumption rate described above is an estimated value obtained through the heat balance calculation, and hence, the error appears in a form of change in temperatures of the molten slag 6 in the electric furnace 1.

The change in the temperatures of the molten slag can be controlled by adjusting the electric power supplied, the amount of inflow of the hot steel-making slag 6' or the amount of reducing agents supplied. In general, the temperatures in the electric furnace 1 are controlled, for example, such that the temperatures of the molten iron fall in the range of 1400 to 1550° C., and the temperatures of the molten slag fall in the range of 1500 to 1650° C.

As to the charging of the hot steel-making slag 6', it is only necessary to prevent the molten slag 6 from overflowing. Thus, the hot steel-making slag 6' may be charged into the electric furnace 1 continuously or intermittently. It should be noted that, in the case where the hot steel-making slag 6' is charged intermittently, it is important to experimentally check, in advance, that the amount of the hot steel-making slag 6' set for each charge does not cause slag foaming and the resulting overflow.

<Processing of Molten Slag>

In order to perform the reduction processing to the molten slag 6, located on the molten iron 5, onto which the hot steel-making slag 6' is charged, it is necessary to charge, in the electric furnace 1, the reducing agent having an amount corresponding to the amount of the hot steel-making slag charged in the electric furnace 1.

The reducing agent (auxiliary-raw-material) may be supplied continuously or intermittently from the auxiliary-raw-material supplying tube 14a provided to the furnace lid, as illustrated in FIG. 3. In addition, the reducing agent may be also supplied continuously or intermittently from a hollow portion of a hollow electrode or a lance 14b for blowing an auxiliary-raw-material (see FIG. 1 and FIG. 4). At this time, it may be possible to mix the reducing agent with at least one material of the slag modifying agent and a raw material containing iron.

In general, carbon materials are used as the reducing agent. As the carbon materials, it may be possible to use, for example, coke ash, anthracite culm, graphite powder, dust powder containing carbon, and fly ash.

The slag modifying agent is used mainly for adjusting ($SiO_2$) or ($Al_2O_3$), and it is necessary to select an appropriate material for the slag modifying agent. It is preferable for the slag modifying agent to contain one type or two or more types selected from $SiO_2$, $CaO$, $Al_2O_3$, and $MgO$. Further, it may be possible to use, as the slag modifying agent, coal ash, slag powder containing the large amount of $SiO_2$ and $Al_2O_3$, brick chips, aluminum dross, and the like. It is preferable for the raw material containing iron to include one type or two or more types selected from iron scrap, reduced iron, and powder dust.

Further, as for the method of preventing the molten slag 6 from foaming and overflowing from the electric furnace 1, it may be possible to use the following method in combination.

(c) A method of suspending, in the molten slag layer, a carbon material with the excessive amount relative to the amount necessary for the reduction processing.

For reducing the steel-making slag, the amount of the reducing agent (auxiliary-raw-material) supplied to the molten slag layer is necessary in the stoichiometric equivalent amount necessary for the reduction reaction between the steel-making slag and the reducing agent. However, in order to prevent the molten slag 6 from being foaming state and to prevent the molten slag 6 from spilling over from the electric furnace 1, it is preferable that 1.1 to 1.6 times the stoichiometric amount necessary for the reduction reaction with the molten slag 6 is set as a predetermined amount of the reducing agent, and the reducing agent is added to the molten slag layer for suspending, thereby preventing the slag foaming from occurring.

If the reducing agent (powder carbon) is less than 1.1 times the stoichiometric amount, it is difficult to achieve the effect of suppressing foaming obtained as a result of the addition of the reducing agent. If the reducing agent exceeds 1.6 times the stoichiometric amount, the further effect of suppressing foaming cannot be obtained.

Further, as for the method of preventing the molten slag 6 from foaming and overflowing from the electric furnace 1, it may be possible to use the following method in combination.

(d) A method of reducing the concentration of C in the molten iron 5 to not more than 3 mass %.

This method is based on the experimental finding that the reduction in the concentration of C in the molten iron 5 to not more than 3 mass % makes it easy to prevent the molten slag 6 from foaming and overflowing from the electric furnace 1.

In the reduction processing apparatus 100, 200, 300 for a steel-making slag, the hot steel-making slag 6' is charged into the molten slag layer in the electric furnace 1 from the slag-supplying container 9 continuously or intermittently, while the slag of the molten slag layer is intermittently discharged from the cinder notch 7 provided on the furnace bottom side wall. Accordingly, in the electric furnace 1, the reducing process of the hot steel-making slag 6' can be continuously performed. Accordingly, the processing efficiency of the steel-making slag is extremely high.

If the thickness of the molten slag layer in the electric furnace 1 increases and reaches a predetermined level, the cinder notch 7 is opened to discharge the molten slag 6 to the outside of the furnace. Further, when the interface between the layer of the molten slag 6 and the molten iron 5 approaches the vicinity of the cinder notch 7, the tap hole 8 located below the cinder notch 7 is opened to discharge the molten iron 5. If the interface between the layer of the molten slag 6 and the molten iron 5 is located close to the cinder notch 7, the separation performance between the molten slag 6 and the molten iron 5 deteriorates.

<Processes after Molten Slag and Molten Iron are Discharged>

The molten slag 6 discharged from the cinder notch 7 is subjected to a granulated and rapid-cooling process immediately, or is received in a container to be subjected to slow cooling, thereby obtaining a product. The molten iron 5 discharged from the tap hole 8 is accommodated in a molten iron pot, and is subjected to a dephosphorization process by supplying oxygen or iron oxide, and dephosphorization agents to the molten iron 5 in a mixed manner. The target phosphorus concentration after the dephosphorization is set to be almost equal to the phosphorus concentration discharged from the blast furnace so as to be used in the steelmaking processes.

The molten iron 5 after the dephosphorization is formed into mold pig iron, or is transferred to a ladle car or molten iron pot, and then, is transported to the steelmaking process. On the other hand, the slag generated through the dephosphorization process has $P_2O_5$ in the high concentration, and hence, is used as phosphate fertilizer or industrial phosphoric acid material.

2) Below, a reduction processing system for a steel-making slag according to a fourth embodiment of the present invention will be described.

Figure 5:
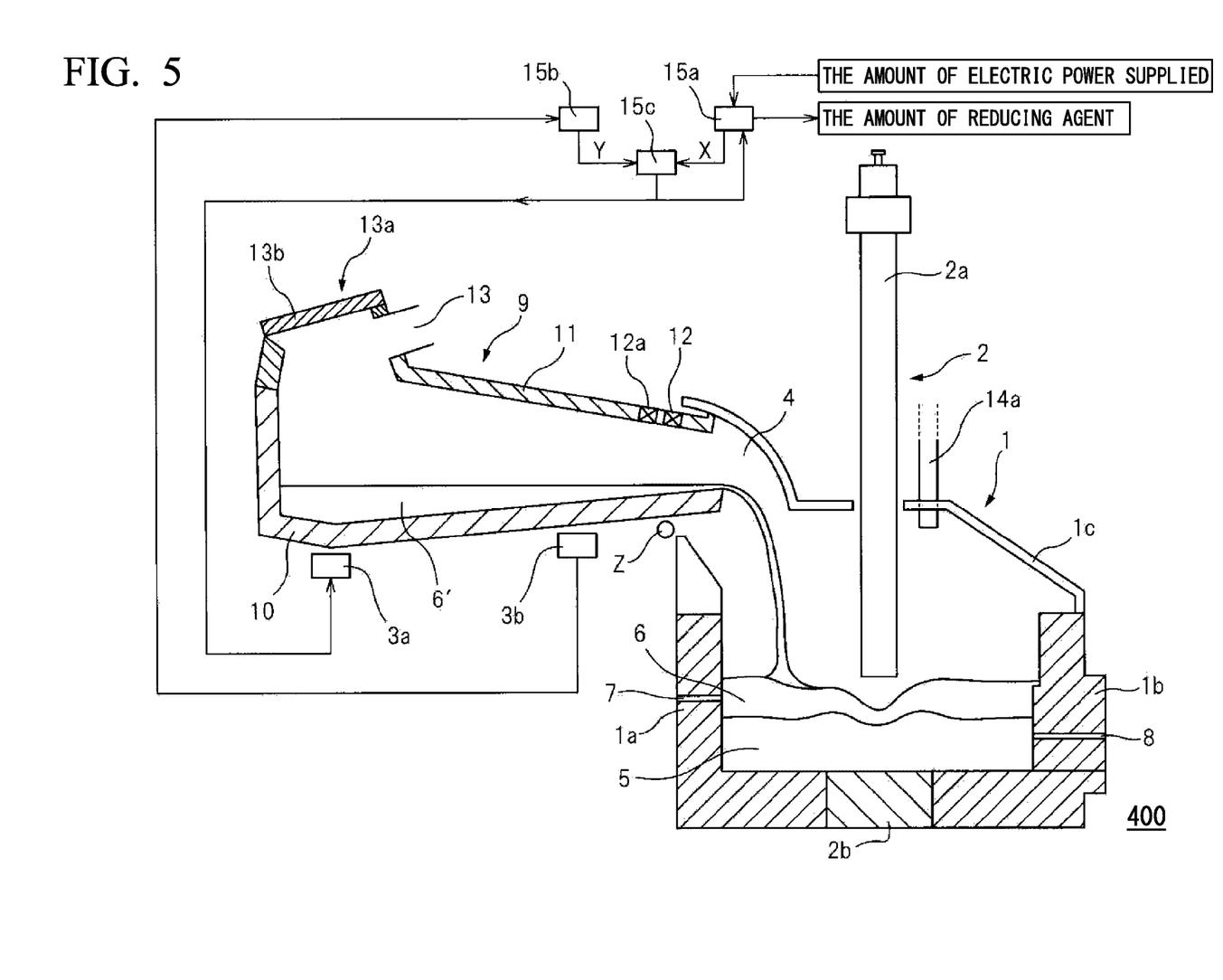
FIG. 5 is a schematic view illustrating a reduction processing apparatus 400 for a steel-making slag for explaining a reduction processing system for a steel-making slag according to a fourth embodiment of the present invention.

FIG. 5 illustrates a reduction processing apparatus 400 for a steel-making slag, which is used in the reduction processing system for a steel-making slag according to this embodiment.

First, the electric power supplied to the electrode 2 of the electric furnace 1 is set, then, based on the set electric power, the supplying rate of the hot steel-making slag to be reduced is calculated. Then, based on the calculated supplying rate of the hot steel-making slag, a predetermined rate for supplying the reducing agent is calculated. However, when the "actual electric power" is apart from the "set electric power", a total amount of the hot steel-making slag to be charged is corrected based on the amount of the total electric power actually supplied.

It should be noted that a predetermined amount of the reducing agent is, as mentioned above, preferably set in a range of 1.1 times to 1.6 times the stoichiometric amount necessary for reduction reaction with the molten slag 6, in order to prevent the slag foaming from occurring in the molten slag 6 and prevent the molten slag 6 from spilling over the electric furnace 1.

Then, the amount Y of the hot steel-making slag charged into the electric furnace 1 is controlled so as to follow the calculated amount X of the hot steel-making slag to be reduced, as a target value.

More specifically, the amount Y of the hot steel-making slag charged into the electric furnace 1 is calculated by measuring the change in the amount of the hot steel-making slag in the slag-supplying container 9 by a weight meter 3$b$, and then inputting the measured value to a calculation unit 15$b$.

The calculated amount Y of the hot steel-making slag charged and the amount X of the hot steel-making slag to be reduced which is calculated based on the amount of the electric power actually supplied are compared by a calculation unit 15$c$. Then, with a control unit, the tilting unit 3$a$ is actuated to adjust the tilting angle of the slag-supplying container 9 with the tilting axis Z being the center such that the amount Y of the hot steel-making slag charged follows the amount X of the hot steel-making slag to be reduced, as a target value. It should be noted that the charging of the hot steel-making slag can be performed continuously or intermittently.

When the hot steel-making slag is continuously charged, the amount Y of the hot steel-making slag may be controlled so as to follow the target value of the amount X of the hot steel-making slag to be reduced. The control method is not specified, but for example, widespread PID control or the like may be used.

On the other hand, when the hot steel-making slag is intermittently charged, as same as the case of the continuous charging, the amount Y of the hot steel-making slag is controlled so as to follow the target value of the amount X of the hot steel-making slag to be reduced. However, for example when a predetermined amount of the hot steel-making slag is collectively supplied at predetermined intervals of time, it is possible to employ the value corresponding to the charging rate per unit time as the amount Y of the hot steel-making slag charged.

In this case, the control can be achieved by setting the amount of the hot steel-making slag collectively supplied and the predetermined intervals of the time in advance, and performing a sequence control. In such a case, it is important to confirm, in advance, the amount of the hot steel-making slag which does not cause the overflowing, even if the hot steel-making slag is collectively supplied.

In addition, a calculation unit calculates a predetermined amount of the reducing agent based on the charging amount X of the hot steel-making slag to be reduced, and then, using the calculated value as a target value, the supplied amount from the auxiliary-raw-material supplying tube 14$a$ is adjusted. In this case, the supplied amount is controlled by a device (not illustrated) that controls the supplied amount from the auxiliary-raw-material supplying tube 14$a$.

EXAMPLES

Next, Examples of the present invention will be described. The conditions described in Examples are merely examples of conditions given for confirming feasibility and effects of the present invention, and conditions related to the present invention are not limited to these examples of condition. The present invention may employ various conditions, provided that they do not depart from the main points of the present invention and the object of the present invention can be achieved.

Example 1

In the reduction processing apparatus 400 for a steel-making slag illustrated in FIG. 5, the hot steel-making slag 6' discharged from a converter in a molten state (rate of solid phase: not more than 25%) was charged into the slag-supplying container 9, and was temporarily stored. Then, the slag-supplying container 9 was tilted once every 10 minutes to charge the hot steel-making slag with approximately 8 tons for each charge into the direct-current electric furnace 1.

The hot steel-making slag 6' was charged into the electric furnace 1 under conditions where pig iron with approximately 130 tons was contained in the electric furnace 1 and a molten slag layer subjected to reduction processing existed on the pig iron with a thickness of approximately 200 mm. Note that the reason for setting the amount of inflow of the hot steel-making slag 6' to approximately 8 tons for each charge is that it has been checked, through preliminary experiments using an actual device, that strong foaming does not occur under this condition.

Further, the rate of inflow of the hot steel-making slag 6' was set to average 800 kg/min. This rate was calculated on the basis of the electric power consumption rate that is necessary for the reduction processing of the hot steel-making slag and is obtained through the method described above in order to continuously supply electric power of approximately 30 MW as described below.

Coke ash was supplied from the auxiliary-raw-material supplying tube 14$a$ into the electric furnace 1 while the electric power is being supplied. This supplying rate was set to 85 kg/min, which corresponds to 1.5 times as fast as the stoichiometric supplying rate. Further, as for the slag modifying agent, fly ash: 378 kg/t-slag and bauxite powder: 47 kg/t-slag were continuously supplied from the auxiliary-raw-material supplying tube 14$a$ onto the molten slag layer to achieve the target basicity: 1.2 and target ($Al_2O_3$): 12 mass %.

The temperature in the electric furnace 1 was controlled to be molten iron temperatures: 1450±5° C. and slag temperatures: 1550±5° C. Since the electric furnace 1 was not provided with any opening portion that communicates with the atmospheric air, the inside of the electric furnace 1 was maintained to be the reducing atmosphere. Table 1 shows compositions of the molten slag 6 and temperatures thereof.

TABLE 1

| | (T.Fe) | (M.Fe) | (CaO) | ($SiO_2$) | (MnO) | (MgO) | ($P_2O_5$) | (mass %) Temp. |
|---|---|---|---|---|---|---|---|---|
| Molten Slag | 18.6 | 2.0 | 49.0 | 12.2 | 6.1 | 8.2 | 1.5 | 1450° C. |

The electric furnace 1 always contained molten iron 5 (C; 3.0 mass %) having the composition shown in Table 2 with the amount of 100 to 150 tons, and the molten slag layer with the thickness of approximately 100 to 300 mm. For the electric furnace 1, the electric power of approximately 30 MW was continuously supplied from the electrode 2 to apply reduction processing to the hot steel-making slag charged into the molten slag layer without causing the slag foaming.

TABLE 2

|  | [C] | [Si] | [Mn] | [P] | [S] | Temp. (mass %) |
|---|---|---|---|---|---|---|
| Composition of Molten Iron | 3.0 | 0.01 | 0.32 | 0.12 | 0.024 | 1450° C. |

The slag of the molten slag layer was discharged once every hour with the amount of approximately 46 tons from the cinder notch 7, and the molten iron 5 was discharged once every five hours with the amount of approximately 44 tons from the tap hole 8. From the components of the discharged molten slag 6 and the components of the discharged molten iron 5, it can be found that the slags were reduced as shown in Table 3 and Table 4, and the concentrations of P and Mn in the molten iron 5 increased.

TABLE 3

|  | (T.Fe) | (M.Fe) | (CaO) | (SiO$_2$) | (Al$_2$O$_3$) | (MnO) | (MgO) | (P$_2$O$_5$) (mass %) |
|---|---|---|---|---|---|---|---|---|
| Discharged Slag | 1.1 | 0 | 40.5 | 32.7 | 12 | 4.7 | 9.7 | 0.28 |

TABLE 4

|  | [C] | [Si] | [Mn] | [P] | [S] (mass %) |
|---|---|---|---|---|---|
| Discharged Molten Iron | 3.0 | 0.01 | 0.80 | 1.40 | 0.038 |

The electric power consumption rate necessary for reduction processing of the molten slag 6 was 607 kWh/t-slag in the case of decarbonized slag at 1450° C. On the other hand, for the purpose of comparison, the same decarbonized slag was charged in a form of cold powder. As a result, the electric power consumption rate was 1314 kWh/t-slag.

Example 2

A reduction and modification process under the same conditions as those for Example 1 except that a hollow electrode was used for the electrode 2 (upper electrode 2a), and, the hollow portion is used as an auxiliary-raw-material supplying tube 14a for supplying the slag modifying agent and the reducing agent.

Temperatures in the electric furnace 1 were controlled so as to be molten iron temperatures: 1450±5° C., and slag temperatures: 1450±5° C. The reduction processing of the hot steel-making slag was continuously performed without causing the overflow of the molten slag 6.

During the reduction processing, the slag in the molten slag layer was discharged once every hour with the amount of approximately 46 tons from the cinder notch 7, and the molten iron 5 was discharged once every five hours with the amount of approximately 44 tons from the tap hole 8. The components of the discharged molten slag 6 and the components of the discharged molten iron 5 were almost the same as those shown in Table 3 and Table 4.

In Examples 1 and 2, the hot steel-making slag with the amount of approximately 8 tons was charged once every 10 minutes simultaneously. Under such charging conditions, the reduction processing of the molten slag 6 was continuously performed without causing the overflow of the molten slag 6. Further, the rate of inflow of the hot steel-making slag was 800 kg/min on average.

This means that, in the apparatus according to the present invention, in the case where the hot steel-making slag is continuously charged at charging rates of 800 kg/min, or at charging rates of not more than 800 kg/min, the foaming is less likely to occur, and under these conditions, the reduction processing of the molten slag 6 can be continuously performed without causing the overflow of the molten slag 6. In other words, Examples 1 to 2, which employ intermittent charging, are examples that demonstrate the applicability of the apparatus according to the present invention to the continuous charging of the hot steel-making slag.

Comparative Example

In order to reduce the steel-making slag having the components shown in Table 1, the steel-making slag with the amount of 20 tons in a hot state was supplied at once into the electric furnace 1 containing the molten iron 5 having the components and temperature shown in Table 2. After the hot steel-making slag is supplied into the electric furnace 1, the slag foaming of the molten iron 5 suddenly occurred, and hence, the operation had to be stopped.

INDUSTRIAL APPLICABILITY

According to the present invention, since the reducing process of the hot steel-making slag is continuously performed without break while discharging the slag intermittently, it is possible to, with low energy-consumption rate and high efficiency, modify the steel-making slag into a material that can be used for various applications such as a cement raw material, a civil engineering material, and a ceramic product, while recovering valuable elements such as Fe, Mn, and P into a molten iron. It is possible to recycle Fe and Mn into the steel-making processes, and use P as a phosphate fertilizer or phosphoric acid material. Further, according to the present invention, in the same electric furnace, it is possible to produce a molten iron by melting and reducing the small scrap iron, reduced iron, powder dusts, and the like. Therefore, the present invention is highly applicable to smelting techniques in the steel industry.

BRIEF DESCRIPTION OF THE REFERENCE SYMBOLS

100, 200, 300, 400 Reduction processing apparatus for a steel-making slag
  1 Electric furnace
  1a, 1b Furnace side wall
  1c Furnace ceiling
  2 Electrode
  2a Upper electrode
  2b Furnace bottom electrode
  3a Tilting unit
  3b Weight meter
  4 Slag-supplying unit
  5 Molten iron
  6 Molten slag 6' hot steel-making slag
7 Cinder notch
8 Tap hole
9 Slag-supplying container
10 Bottom wall
11 Upper wall
12 Nozzle
12a Burner
13 Exhausting portion
13a Opening portion
13b Lid
14 Auxiliary-raw-material supplying unit
14a Auxiliary-raw-material supplying tube
14b Lance for blowing auxiliary-raw-material
15a, 15b, 15c Calculation unit
X Amount of hot steel-making slag to be reduced by a set electric power
Y amount of hot steel-making slag charged to electric furnace
Z Tilting Axis

The invention claimed is:

1. A reduction processing apparatus for a steel-making slag that continuously performs reduction processing to a hot steel-making slag by using an electric furnace, the apparatus comprising:
   a slag-supplying container configured to charge the hot steel-making slag having fluidity into the electric furnace the hot-steel making slag having a rate of solid phase of not more than 30% if a temperature of the hot steel-making slag is 1400° C.;
   an electrode that is provided at the electric furnace and heats a molten slag layer on a molten iron produced by reducing the hot steel-making slag together with the molten iron;
   an auxiliary-raw-material supplying unit that supplies an auxiliary-raw-material including a reducing agent to the molten slag layer; and
   a tilting unit that tilts the slag-supplying container with a tilting axis being a center, and adjusts a charging amount of the hot steel-making slag to the electric furnace,
   wherein the electric furnace is a closed and fixed electric furnace.

2. The reduction processing apparatus for a steel-making slag according to claim 1, wherein the closed and fixed electric furnace is a direct-current electric furnace.

3. The reduction processing apparatus for a steel-making slag according to claim 1, wherein the auxiliary-raw-material supplying unit is an auxiliary-raw-material supplying tube which is provided in the electrode.

4. The reduction processing apparatus for a steel-making slag according to claim 1, wherein the slag-supplying container is provided with an exhausting portion that discharges exhaust gas from the electric furnace.

5. A reduction processing system for a steel-making slag by using the reduction processing apparatus according to claim 1, the system comprising:
   a measuring unit that measures electric power supplied to the electrode;
   a calculation unit that calculates an amount of the hot steel-making slag to be reduced based on the measured electric power, and then calculates a predetermined amount of reducing agent based on the calculated amount of the hot steel-making slag to be reduced; and
   a control unit that controls a tilting angle of the slag-supplying container by actuating the tilting unit such that an amount of the hot steel-making slag charged into the electric furnace follows the amount of the hot steel-making slag to be reduced, and controls an amount of the auxiliary-raw-material supplied from the auxiliary-raw-material supplying unit so as to supply the predetermined amount of the reducing agent.

* * * * *